United States Patent
Can et al.

(10) Patent No.: US 9,916,090 B1
(45) Date of Patent: Mar. 13, 2018

(54) TECHNIQUES FOR DYNAMICALLY ADJUSTING SLICE SIZE

(71) Applicant: EMC IP Holding Company LLC, Hopkinton, MA (US)

(72) Inventors: Khang Can, Framingham, MA (US); Qin Tau, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 219 days.

(21) Appl. No.: 14/861,488

(22) Filed: Sep. 22, 2015

(51) Int. Cl.
*G06F 3/06* (2006.01)

(52) U.S. Cl.
CPC .......... *G06F 3/0604* (2013.01); *G06F 3/0644* (2013.01); *G06F 3/0689* (2013.01)

(58) Field of Classification Search
CPC ...... G06F 9/5083; G06F 3/061; G06F 3/0604; G06F 3/0631; G06F 3/0644; G06F 3/0665; G06F 3/0689; G06F 3/064
See application file for complete search history.

(56) References Cited

U.S. PATENT DOCUMENTS

| | | | |
|---|---|---|---|
| 7,949,637 B1 | 5/2011 | Burke | |
| 8,935,493 B1 | 1/2015 | Dolan et al. | |
| 9,152,349 B2 | 10/2015 | Yochai | |
| 2003/0023811 A1* | 1/2003 | Kim | G06F 3/0601 711/114 |
| 2012/0047346 A1* | 2/2012 | Kawaguchi | G06F 3/0605 711/165 |
| 2012/0102350 A1* | 4/2012 | Belluomini | G06F 1/3221 713/324 |
| 2013/0254477 A1* | 9/2013 | Swanson | G06F 3/061 711/112 |

* cited by examiner

*Primary Examiner* — Reginald G Bragdon
*Assistant Examiner* — Thanh D Vo
(74) *Attorney, Agent, or Firm* — Muirhead and Saturnelli, LLC

(57) ABSTRACT

Described are techniques for determining slice sizes. First I/O workload information is received for a slice having a corresponding logical address subrange of a logical address range of a logical device. The corresponding logical address subrange is a first size denoting a size of the slice at a first point in time when the slice has a current I/O workload denoted by the first I/O workload information. It is determined, in accordance with the first I/O workload information, whether to adjust the size of the slice. Responsive to determining to adjust the size of the slice, first processing is performed that adjusts the size of the slice such as by partitioning the slice or merging the slice with one or more other adjacent slices.

20 Claims, 10 Drawing Sheets

| Temperature range 510 | Slice Size 520 |
|---|---|
| 0 IOPS/GB ≤ T < 1 IOPS/GB | 16 GB |
| 1 IOPS/GB ≤ T < 2 IOPS/GB | 8 GB |
| 2 IOPS/GB ≤ T < 4 IOPS/GB | 4 GB |
| 4 IOPS/GB ≤ T < 8 IOPS/GB | 2 GB |
| 8 IOPS/GB ≤ T < 16 IOPS/GB | 1 GB |
| 16 IOPS/GB ≤ T < 32 IOPS/GB | 512 MB |
| 32 IOPS/GB ≤ T < 64 IOPS/GB | 256 MB |
| 64 IOPS/GB ≤ T < 128 IOPS/GB | 128 MB |
| 128 IOPS/GB ≤ T < 256 IOPS/GB | 64 MB |
| 256 IOPS/GB ≤ T < 512 IOPS/GB | 32 MB |
| 512 IOPS/GB ≤ T < 1024 IOPS/GB | 16 MB |
| 1024 IOPS/GB ≤ T | 8 MB |

FIG. 5

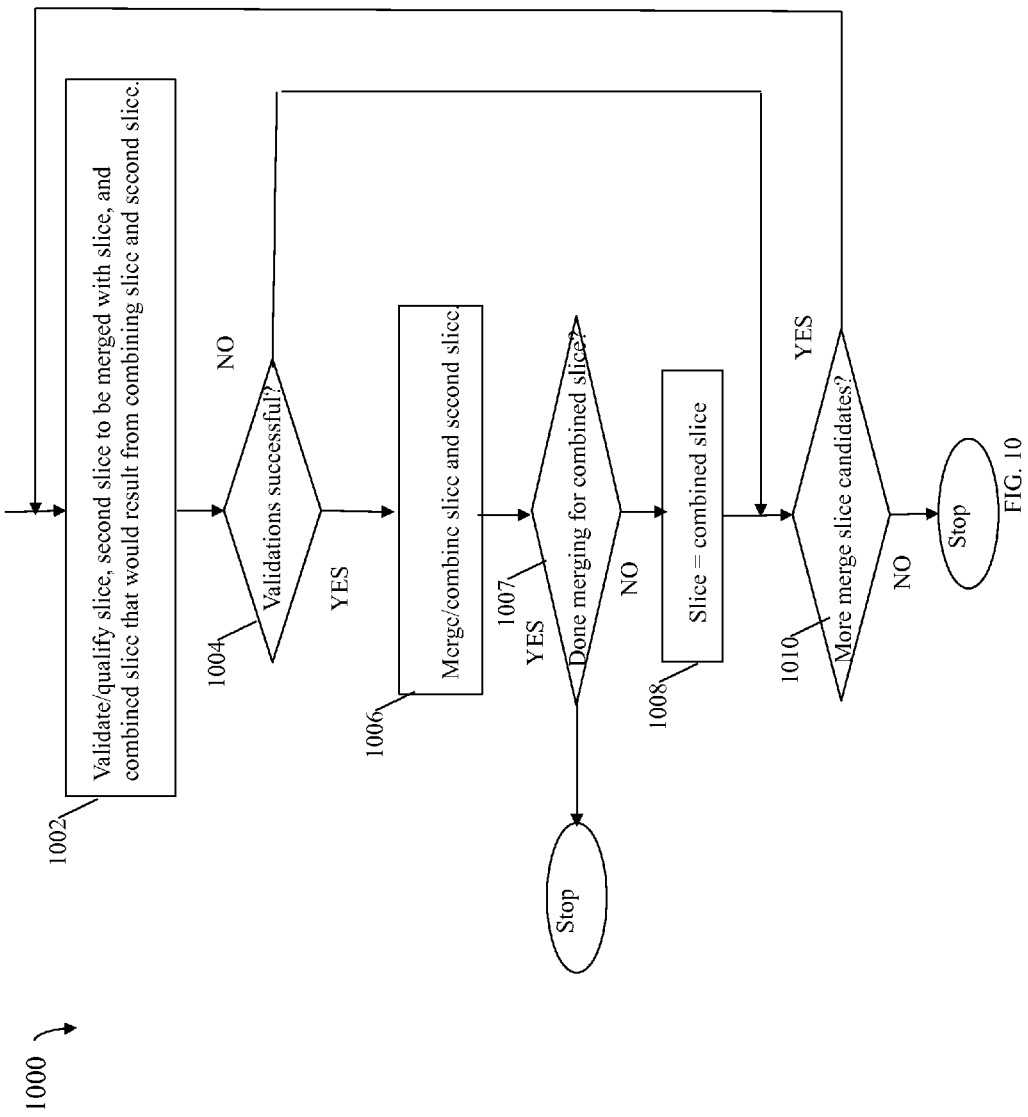

TECHNIQUES FOR DYNAMICALLY ADJUSTING SLICE SIZE

BACKGROUND

Technical Field

This application generally relates to data storage.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. These may or may not correspond to the actual physical drives. Allowing multiple host systems to access the single data storage system allows the host systems to share data stored therein.

SUMMARY OF THE INVENTION

In accordance with one aspect of the invention is a method of determining slice sizes comprising: receiving first I/O workload information for a slice having a corresponding logical address subrange of a logical address range of a logical device, said corresponding logical address subrange being a first size denoting a size of the slice at a first point in time when the slice has a current I/O workload denoted by the first I/O workload information; determining, in accordance with the first I/O workload information, whether to adjust the size of the slice; and responsive to determining to adjust the size of the slice, performing first processing that adjusts the size of the slice. The first processing may include determining whether to partition the slice in accordance with one or more partitioning criteria; and responsive to determining to partition the slice in accordance with the one or more partitioning criteria, partitioning the slice into a plurality of slices each of a smaller size than the first size. The one or more partitioning criteria may include validating the slice for partitioning, and wherein validating the slice for partitioning may include performing any of: determining that the first I/O workload information maps to a first predetermined slice size that is smaller than the first size; and determining that the first size maps to a first predetermined workload range and the first I/O workload information exceeds the first predetermined workload range. At least one of the plurality of slices may have a size equal to the first predetermined slice size. The first processing may include determining, in accordance with one or more merge criteria, whether to combine the slice with one or more other adjacent slices of the logical device into a single combined slice having a size larger than the first size; and responsive to determining that the slice is to be combined with the one or more adjacent slices, combining the slice with the one or more adjacent slices into the single combined slice, wherein the one or more adjacent slices include a second slice. The one or more merge criteria may include validating the slice for merging, and wherein validating the slice for merging may include performing any of: determining that the first I/O workload information maps to a first predetermined slice size that is larger than the first size, and determining that the first size maps to a first predetermined workload range and the first I/O workload information does not exceed the first predetermined workload range. The one or more merge criteria may include validating the second slice for merging, wherein validating the second slice for merging may include determining that the second slice is adjacent to the slice in the logical address range of the logical device. The second slice may have a second corresponding logical address subrange of the logical device, and the second corresponding logical address subrange may be a second size denoting a size of the second slice at the first point in time when the second slice has a current I/O workload denoted by second I/O workload information. Validating the second slice for merging may include performing any of: determining that the second I/O workload information for the second slice maps to a predetermined slice size that is larger than second size, and determining that the second size maps to a second predetermined workload range and the second I/O workload information does not exceed the second predetermined workload range. Combining the slice and the second slice may result in a first combined slice of a third size having a resulting third I/O workload information. The one or more merge criteria may include validating the first combined slice, wherein validating the first combined slice may include performing any of: determining that the third I/O workload information maps to a predetermined slice size and the third size does not exceed the predetermined slice size; and determining that the third size maps to a predetermined workload range and the third I/O workload information does not exceed the predetermined workload range. The second slice may be determined as adjacent to the slice and the second corresponding logical address subrange and the corresponding logical address subrange may form a contiguous logical address subrange included in the logical address range of the logical device The logical device may be a virtually provisioned logical device. The slice may be one of a plurality of slices of the logical device. Each of the plurality of slices may be associated with a logical address subrange of the logical address range of the logical device. The method may include performing processing to collect I/O workload information for each of the plurality of slices for a first time period, said first point in time denoting an end of the first time period. The I/O workload information for each of the plurality of slices may include an I/O workload density. The I/O workload density may be represented as an average I/O workload per unit of storage. The average I/O workload may be an average number of I/Os per unit of time per unit of storage. The first processing may use information including a table of predetermined slice sizes associated with corresponding predetermined I/O workload values. Each of the predetermined slice sizes may denote a slice size used when current I/O workload for a single slice is included in a range of one or more predetermined I/O workload values associated with said each predetermined slice size.

In accordance with another aspect of the invention is a system comprising a processor; and a memory comprising code stored therein that, when executed, performs a method of determining slice sizes comprising: receiving first I/O workload information for a slice having a corresponding logical address subrange of a logical address range of a logical device, said corresponding logical address subrange being a first size denoting a size of the slice at a first point in time when the slice has a current I/O workload denoted by the first I/O workload information; determining, in accordance with the first I/O workload information, whether to adjust the size of the slice; and responsive to determining to adjust the size of the slice, performing first processing that adjusts the size of the slice.

In accordance with another aspect of the invention is a computer readable medium comprising code stored thereon that, when executed, performs a method of determining slice sizes comprising: receiving first I/O workload information for a slice having a corresponding logical address subrange of a logical address range of a logical device, said corresponding logical address subrange being a first size denoting a size of the slice at a first point in time when the slice has a current I/O workload denoted by the first I/O workload information; determining, in accordance with the first I/O workload information, whether to adjust the size of the slice; and responsive to determining to adjust the size of the slice, performing first processing that adjusts the size of the slice. The first processing may include performing any of: determining, in accordance with partitioning criteria, whether to partition the slice; and determining, in accordance with merge criteria, whether to merge the slice with one or more other slices.

BRIEF DESCRIPTION OF THE DRAWINGS

Features and advantages of the present invention will become more apparent from the following detailed description of exemplary embodiments thereof taken in conjunction with the accompanying drawings in which:

FIG. 5 is an example of a table of predetermined temperature or I/O workload/GB ranges and corresponding predetermined slice sizes that may be used in an embodiment in accordance with techniques herein; and FIGS. 7-10 are flowcharts of processing steps that may be performed in an embodiment in accordance with techniques herein.

DETAILED DESCRIPTION OF EMBODIMENT(S)

Figure 1:
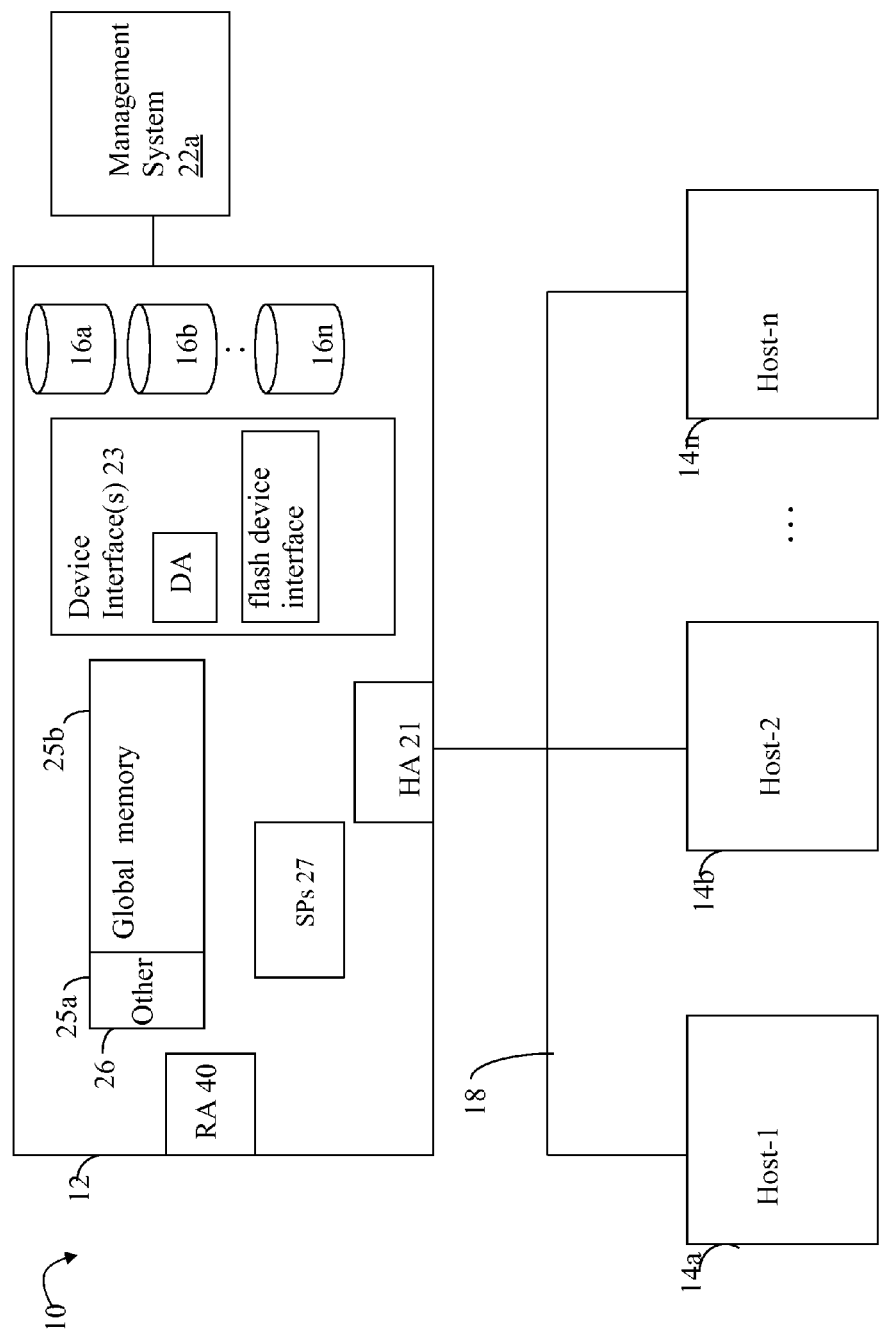
FIGS. 1 and 3 are examples of components that may be included in a system in accordance with techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular physical device may perform processing to either read data from, or write data to, the corresponding physical device location for an I/O operation.

Also shown in FIG. 1 is a management system 22a that may be used to manage and monitor the system 12. In one embodiment, the management system 22a may be a computer system which includes data storage system management software such as may execute in a web browser. A data storage system manager may, for example, view information about a current data storage configuration such as LUNs, storage pools, and the like, on a user interface (UI) in display device of the management system 22a.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations that other directors originate. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

An embodiment in accordance with techniques herein may have one or more defined storage tiers. Each tier may generally include physical storage devices or drives having one or more attributes associated with a definition for that tier. For example, one embodiment may provide a tier definition based on a set of one or more attributes or properties. The attributes may include any one or more of a storage type or storage technology, device performance characteristic(s), RAID (Redundant Array of Independent Disks) group configuration, storage capacity, and the like. RAID groups are known in the art. The PDs of each RAID group may have a particular RAID level (e.g., RAID-1, RAID-5 3+1, RAID-5 7+1, and the like) providing different levels of data protection. For example, RAID-1 is a group of PDs configured to provide data mirroring where each data portion is mirrored or stored on 2 PDs of the RAID-1 group. The storage type or technology may specify whether a physical storage device is an SSD (solid state drive) drive (such as a flash drive), a particular type of SSD drive (such using flash memory or a form of RAM), a type of rotating magnetic disk or other non-SSD drive (such as a 10K RPM rotating disk drive, a 15K RPM rotating disk drive), and the like. Performance characteristics may relate to different performance aspects of the physical storage devices of a particular type or technology. For example, there may be multiple types of rotating disk drives based on the RPM characteristics of the disk drives where disk drives having different RPM characteristics may be included in different storage tiers. Storage capacity may specify the amount of data, such as in bytes, that may be stored on the drives. An embodiment may define one or more such storage tiers. For example, an embodiment in accordance with techniques herein that is a multi-tiered storage system may define two storage tiers including a first tier of all SSD drives and a second tier of all non-SSD drives. As another example, an embodiment in accordance with techniques herein that is a multi-tiered storage system may define three storage tiers including a first tier of all SSD drives which are flash drives, a second tier of all 15K RPM rotating disk drives, and a third tier of all 7.2K RPM rotating disk drives. In terms of general expected performance, the SSD or flash tier may be considered the highest performing tier. The second tier of 15K RPM disk drives may be considered the second or next highest performing tier and the 7.2K RPM disk drives may be considered the lowest or third ranked tier in terms of expected performance. The foregoing are some examples of tier definitions and other tier definitions may be specified and used in an embodiment in accordance with techniques herein.

Figure 2:
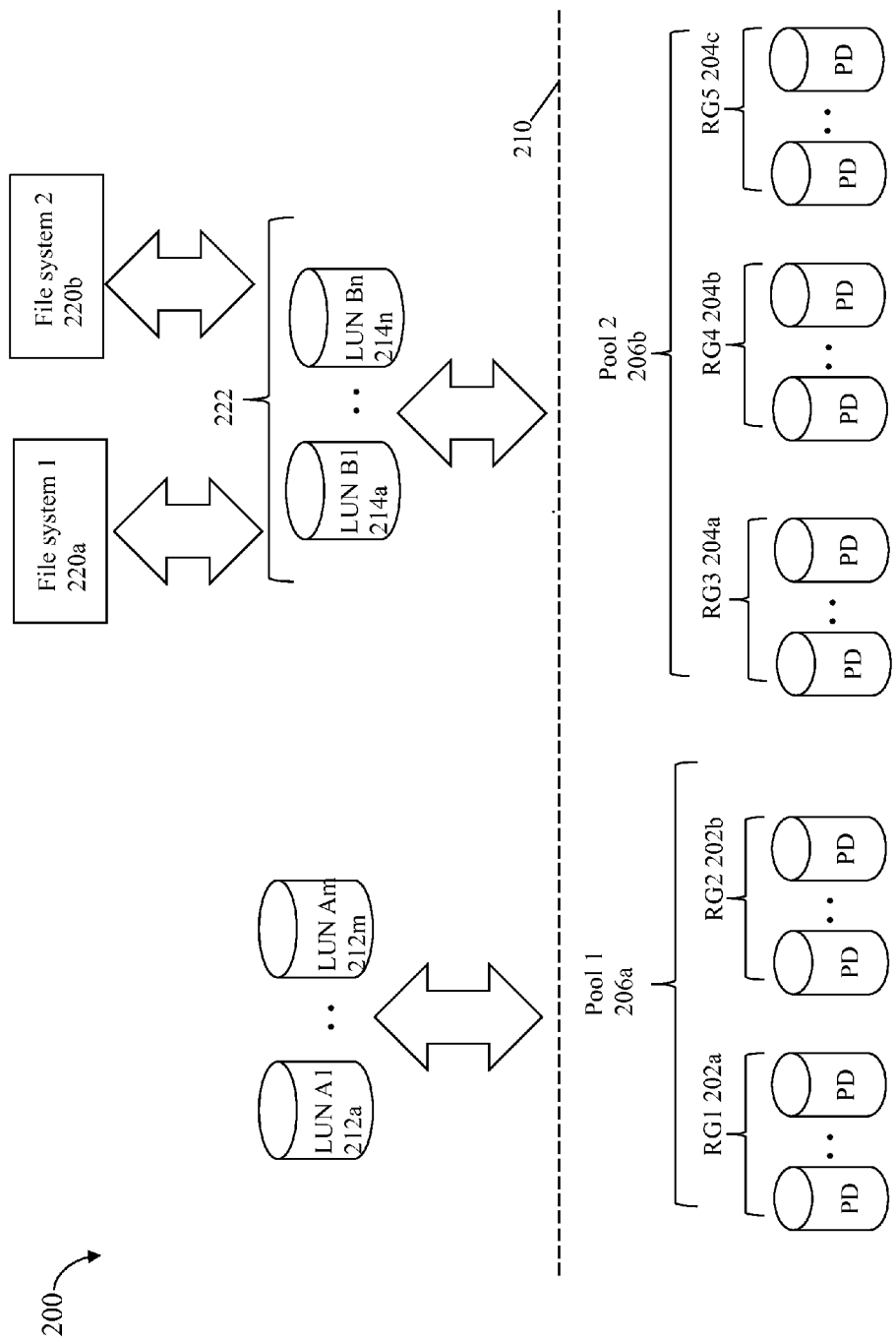
FIG. 2 is an example illustrating physical and logical views of entities in connection with storage in an embodiment in accordance with techniques herein.

In a data storage system in an embodiment in accordance with techniques herein, PDs may be configured into a pool or group of physical storage devices where the data storage system may include many such pools of PDs such as illustrated in FIG. 2. Each pool may include one or more configured RAID groups of PDs.

Depending on the particular embodiment, each pool may also include only PDs of the same storage tier with the same type or technology, or may alternatively include PDs of different storage tiers with different types or technologies. For example, with reference to FIG. 2, a first pool, pool 1 2016a, may include a first RAID group (RG) of 10K RPM rotating disk drives (denoted as RG1 202a) of one storage tier and also include a second RG of flash-based drives (denoted as RG2 202b) of another storage tier. A second pool, pool 2 206b, may include 3 RGs (denoted RG3 204a, RG 4 204b and RG 5 204c) each of which includes only flash-based drives of the foregoing other storage tier.

The components illustrated in the example 200 below the line 210 may be characterized as providing a physical view of storage in the data storage system and the components illustrated in the example 200 above the line 210 may be characterized as providing a logical view of storage in the data storage system. The pools 206a-b and RGs 202a-b, 204a-c of the physical view of storage may be further configured into one or more logical entities, such as LUNs or logical devices. For example, LUNs 212a-m may be configured from pool 1 206a and LUNs 214a-n may be configured from pool 206b.

A data storage system may support one or more different types of logical devices presented as LUNs. For example, a data storage system may provide for configuration of thick or regular LUNs and also virtually provisioned or thin LUNs. A thick or regular LUN is a logical device that, when configured to have a total usable capacity such as presented to a user for storing data, has all the physical storage provisioned for the total usable capacity. In contrast, a thin or virtually provisioned LUN having a total usable capacity (e.g., a total logical capacity as published or presented to a user) is one where physical storage may be provisioned on demand, for example, as data is written to different portions of the LUN's logical address space. Thus, at any point in time, a thin or virtually provisioned LUN having a total usable capacity may not have an amount of physical storage provisioned for the total usable capacity. The granularity or the amount of storage provisioned at a time for virtually provisioned LUN may vary with embodiment. In one embodiment, physical storage may be allocated, such as a single allocation unit of storage, the first time there is a write to a particular target logical address (e.g., LUN and location or offset on the LUN). The single allocation unit of physical storage may be larger than the size of the amount of data written and the single allocation unit of physical storage is then mapped to a corresponding portion of the logical address range of a LUN. The corresponding portion of the logical address range includes the target logical address. Thus, at any point in time, not all portions of the logical address space of a virtually provisioned device may be associated or mapped to allocated physical storage depending on which logical addresses of the virtually provisioned LUN have been written to at a point in time.

Thin devices and thin provisioning, also referred to respectively as virtually provisioned devices and virtual provisioning, are described in more detail, for example, in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, and U.S. Pat. No. 7,949,637, Issued May 24, 2011, Storage Management for Fine Grained Tiered Storage with Thin Provisioning, to Burke, both of which are incorporated by reference herein.

It should be noted that the total usable capacity denoting a total logical capacity of LUNs (where at least one of the LUNs is a thin LUN) configured from a pool may exceed the physical capacity of the underlying PDs. For example, the total usable capacity denoting the total logical capacity of LUNs 212a-m, which includes at least one thin LUN, may exceed the amount of physical storage capacity of PDs of the pool 1 206a. Similarly, the total usable capacity denoting the total logical capacity of LUNs 214a-n, which includes at least one thin LUN, may exceed the amount of physical storage capacity of PDs of the pool 2 206b. The amount by which the total logical capacity or total usable capacity of all LUNs in a specified set exceeds the physical storage capacity, such as of a pool, may be referred to as an oversubscribed capacity.

LUNs configured from a pool may be further mapped to one or more other logical entities. For example, referring again to FIG. 2, group 222 of LUNs 214a-n may be configured as thin or virtually provisioned LUNs which are used to provide physical storage for file systems, such as file system 1 220a and file system 2 220b. The file systems 220a-b may be any suitable file system known in the art such as an NFS (Network File System) file system or a CIFS (Common Internet File System) file system.

Figure 3:
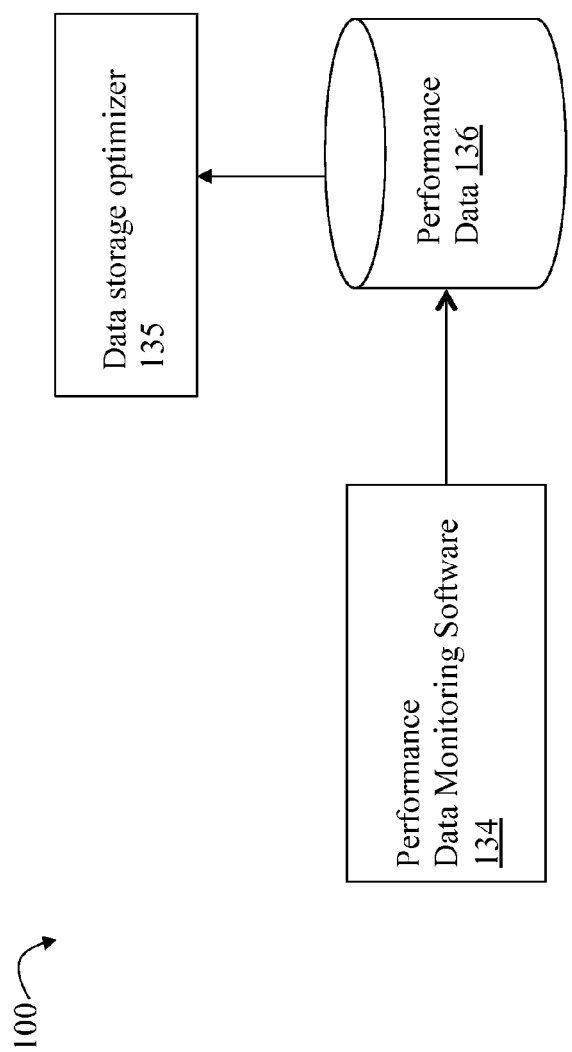

Referring to FIG. 3, shown is an example 100 of components that may be used in an embodiment in connection with techniques herein. The example 100 includes performance data monitoring software 134 which gathers performance data about the data storage system. The software 134 may gather and store performance data 136. This performance data 136 may also serve as an input to other software, such as used by the data storage optimizer 135 in connection with performing data storage system optimizations, which attempt to enhance the performance of I/O operations, such as those I/O operations associated with data storage devices 16a-16n of the system 12 (as in FIG. 1). For example, the performance data 136 may be used by a data storage optimizer 135 in an embodiment in accordance with techniques herein. The performance data 136 may be used in determining and/or optimizing one or more statistics or metrics such as may be related to, for example, an I/O workload for one or more physical devices, a pool or group of physical devices, logical devices or volumes (e.g., LUNs), thin or virtually provisioned devices (described in more detail elsewhere herein), portions of thin devices, and the like. The I/O workload may also be a measurement or level of "how busy" a device is, for example, in terms of I/O operations (e.g., I/O throughput such as number of I/Os/second, response time (RT), and the like). Examples of workload information and other information that may be obtained and used in an embodiment in accordance with techniques herein are described in more detail elsewhere herein.

In one embodiment in accordance with techniques herein, components of FIG. 3, such as the performance monitoring software 134, performance data 136 and/or data storage optimizer 135, may be located and execute on a system or processor that is external to the data storage system. As an alternative or in addition to having one or more components execute on a processor, system or component external to the data storage system, one or more of the foregoing components may be located and execute on a processor of the data storage system itself.

The response time for a storage device or volume may be based on a response time associated with the storage device or volume for a period of time. The response time may be based on read and write operations directed to the storage device or volume. Response time represents the amount of time it takes the storage system to complete an I/O request (e.g., a read or write request). Response time may be characterized as including two components: service time and wait time. Service time is the actual amount of time spent servicing or completing an I/O request after receiving the request from a host via an HA 21, or after the storage system 12 generates the I/O request internally. The wait time is the amount of time the I/O request spends waiting in line or queue waiting for service (e.g., prior to executing the I/O operation).

It should be noted that the back-end (e.g., physical device) operations of read and write with respect to a LUN, thin device, and the like, may be viewed as read and write requests or commands from the DA 23, controller or other backend physical device interface. Thus, these are operations may also be characterized as a number of operations with respect to the physical storage device (e.g., number of physical device reads, writes, and the like, based on physical device accesses). This is in contrast to observing or counting a number of particular type of I/O requests (e.g., reads or writes) as issued from the host and received by a front end component such as an HA 21. To illustrate, a host read request may not result in a read request or command issued to the DA if there is a cache hit and the requested data is in cache. The host read request results in a read request or command issued to the DA 23 to retrieve data from the physical drive only if there is a read cache miss. Furthermore, when writing data of a received host I/O request to the physical device, the host write request may result in multiple reads and/or writes by the DA 23 in addition to writing out the host or user data of the request. For example, if the data storage system implements a RAID data protection technique, such as RAID-5, additional reads and writes may be performed such as in connection with writing out additional parity information for the user data. Thus, observed data gathered to determine workload, such as observed numbers of reads and writes (or more generally I/O operations), may refer to the read and write requests or commands performed by the DA. Such read and write commands may correspond, respectively, to physical device accesses such as disk reads and writes that may result from a host I/O request received by an HA 21.

The optimizer 135 may perform processing to determine how to allocate or partition physical storage in a multi-tiered environment for use by multiple applications. The optimizer 135 may also perform other processing such as, for example, to determine what particular portions of LUNs, such as thin devices, to store on physical devices of a particular tier, evaluate when to move data between physical drives of different tiers, and the like. It should be noted that the optimizer 135 may generally represent one or more components that perform processing as described herein as well as one or more other optimizations and other processing that may be performed in an embodiment.

The data storage optimizer in an embodiment in accordance with techniques herein may perform processing to determine what data portions of devices such as thin devices to store on physical devices of a particular tier in a multi-tiered storage environment. Such data portions of a thin device may be automatically placed in a storage tier. The data portions may also be automatically relocated or moved to a different storage tier as the I/O workload and observed performance characteristics for the data portions change over time. In accordance with techniques herein, analysis of I/O workload for data portions of thin devices may be performed in order to determine whether particular data portions should have their data contents stored on physical devices located in a particular storage tier.

Promotion may refer to movement of data from a source storage tier to a target storage tier where the target storage tier is characterized as having devices of higher performance than devices of the source storage tier. For example movement of data from a tier of 7.2K RPM drives to a tier of flash drives may be characterized as a promotion. Demotion may refer generally to movement of data from a source storage tier to a target storage tier where the source storage tier is characterized as having devices of higher performance than devices of the target storage tier. For example movement of data from a tier of flash drives to a tier of 7.2K RPM drives may be characterized as a demotion.

The data storage optimizer in an embodiment in accordance with techniques herein may perform data movement optimizations generally based on any one or more data movement criteria. For example, in a system including 3 storage tiers with tier 1 of flash drives, tier 2 of 15K RPM disk drives and tier 3 of 7.2K RPM disk drives, the criteria may include identifying and placing at least some of the busiest data portions having the highest I/O workload on the highest performance storage tier, such as tier 1—the tier flash-based—in the multi-tiered storage system. The data movement criteria may include identifying and placing at least some of the coldest/most inactive data portions having the lowest I/O workload on the lowest or lower performance storage tier(s), such as any of tiers 2 and tier 3. As another example, the data movement criteria may include maintaining or meeting specified service level objectives (SLOs). An SLO may define one or more performance criteria or goals to be met with respect to a set of one or more LUNs where the set of LUNs may be associated, for example, with an application, a customer, a host or other client, and the like. For example, an SLO may specify that the average I/O RT (such as measured from the front end or HA of the data storage system) should be less than 5 milliseconds (ms.). Accordingly, the data storage optimizer may perform one or more data movements for a particular LUN of the set depending on whether the SLO for the set of LUNs is currently met. For example, if the average observed I/O RT for the set of one or more LUNs is 6 ms. the data storage optimizer may perform one or more data movements to relocate data portion(s) of any of the LUNs, such as currently located in tier 3, to a higher performance storage tier, such as tier 1. Data portions of a LUN may be initially placed or located in a storage tier based on an initial placement or allocation policy. Subsequently, as data operations are performed with respect to the different data portions and I/O workload data collected, data portions may be automatically relocated or placed in different storage tiers having different performance characteristics as the observed I/O workload or activity of the data portions change over time. In such an embodiment using the data storage optimizer, it may be beneficial to identify which data portions currently are hot (active or having high I/O workload or high level of I/O activity) and which data portions are cold (inactive or idle with respect to I/O workload or activity). Identifying hot data portions may be useful, for example, to determine data movement candidates to be relocated to another storage tier. For example, if trying to improve performance because and SLO is violated, it may be desirable to relocate or move a hot data portion of a LUN currently stored on a low performance tier to a higher performance tier to increase overall performance for the LUN.

An embodiment may use a data storage optimizer such as, for example, EMC® Fully Automated Storage and Tiering for Virtual Pools (FAST VP) by EMC Corporation, providing functionality as described herein for such automated evaluation and data movement optimizations. For example, different techniques that may be used in connection with the data storage optimizer are described in U.S. patent application Ser. No. 13/466,775, filed May 8, 2012, PERFORMING DATA STORAGE OPTIMIZATIONS ACROSS MULTIPLE DATA STORAGE SYSTEMS, which is incorporated by reference herein.

In at least one embodiment in accordance with techniques herein, one or more I/O statistics may be observed and collected for individual partitions, or slices of each LUN, such as each thin or virtually provisioned LUN. The logical address space of each LUN may be divided into partitions each of which corresponds to a subrange of the LUN's logical address space. Thus, I/O statistics may be maintained for individual partitions or slices of each LUN where each such partition or slice is of a particular size and maps to a corresponding subrange of the LUN's logical address space.

An embodiment may have different size granularities or units. For example, consider a case for a thin LUN having a first logical address space where I/O statistics may be maintained for a first slice having a corresponding logical address subrange of the first logical address space. The embodiment may allocate physical storage for thin LUNs in allocation units referred to as chunks. In some cases, there may be multiple chunks in a single slice (e.g. where each chunk may be less than the size of a slice for which I/O statistics are maintained). Thus, the entire corresponding logical address subrange of the first slice may not be mapped to allocated physical storage depending on what logical addresses of the thin LUN have been written to. Additionally, the embodiment may perform data movement or relocation optimizations based on a data movement size granularity. In at least one embodiment, the data movement size granularity or unit may be the same as the size of a slice for which I/O statistics are maintained and collected.

In at least one data storage system not in accordance with techniques described herein, a fixed size slice may be used for each LUN's logical address space. For example, the size of each slice may be 256 megabytes (MB) thereby denoting that I/O statistics are collected for each 256 MB portion of logical address space and where data movement optimizations are performed which relocate or move data portions which are 256 MB in size. As the storage capacity in a storage environment increases, so does the number of data slices for which I/O workload statistics are collected for use with data storage optimizations as described above. Thus, having such a large number of sets of I/O statistics to be collected and analyzed for which data movement candidates are proposed by the data storage optimizer may present scalability challenges by requiring use of additional data storage system resources (e.g., memory, computational time) to accordingly scale up with increased storage capacity.

Additionally, using a fixed or same slice size for all LUNs in the data storage system where I/O statistics are collected per slice and where data movements relocate slice size data portions may present an additional problem. It may be, for example, that not all the data within the single slice has the same I/O workload. For example, only a very small piece of the data slice may actually be active or hot with the remaining data of the slice being idle or otherwise relatively inactive. In such a case where I/O statistics are collected per slice, it is not possible to determine which subportions of the single slice are active and should be relocated. Furthermore, relocating the entire slice of data to a highest performance tier, such as flash-based tier, may be an inefficient use of the most expensive (cost/GB) storage tier in the system when only a fraction of the data slice is "hot" (very high I/O workload) with remaining slice data inactive or idle. It may be desirable to provide for a finer granularity of I/O statistics collection and a finer granularity of data movement in such cases. However, as the size of the data portion for which I/O statistics gets smaller, the total number of sets of I/O statistics further increases and places in further increased demands on system resources.

As described in following paragraphs, techniques herein provide for an adjustable slice size for which I/O statistics denoting I/O workload are collected. Such techniques provide for using various slice sizes for different slices of a logical address space. Such techniques may provide a finer slice granularity for data portions and logical address space subranges having higher I/O workloads whereby the slice size may further decrease as the associated I/O workload increases. In a similar manner, techniques herein provide for increasing the size of a slice as the associated I/O workload decreases. Techniques described in following paragraphs are scalable and dynamically modify slice sizes associated with different logical address space portions as associated I/O workload changes over time. In such an embodiment in accordance with techniques herein, data movements may be performed that relocate data portions of particular sizes equal to current adjustable slice sizes. In at least one embodiment, the adjustable slice sizes are used to define sizes of data portions/logical address space portions for which I/O statistics are collected and for which data movements are performed. The data movement granularity size is adjustable and varied and is equal to whatever the current adjustable slice values are at a point in time.

As described in more detail below, an adjustable slice size is used to track and calculate slice "temperature" denoting the I/O workload directed to a slice. The temperature may be more generally characterized by determining one or more I/O metrics or statistics related to I/O activity. In a typical data storage system, there may be a large portion of data which is inactive (cold). For this inactive data, techniques may be used herein to simplify management by treating the entire large data portion as a single slice. Meanwhile, there may be a small portion of busy highly accessed (hot) data for which a finer granularity of slice size may be used to improve efficiency of data movement optimizations and use of the different storage tiers. Using adjustable slice size allows an embodiment of a data storage optimizer to easily scale upwards with larger storage capacity while also handling smaller data portions if needed to increase accuracy and efficiency associated with data movement relocation and analysis.

In one embodiment, the various slice sizes may be determined based on the average temperature, I/O activity, or I/O workload per unit of storage. For example, in one embodiment, the I/O statistic used to measure the average temperature, I/O activity or I/O workload may be expressed in I/Os per second (IOPS). It should be noted that more generally, any suitable I/O statistic may be used. Additionally, in one embodiment, I/O workload may be expressed as a normalized I/O workload or as an I/O workload density where the unit of storage (denoting a logical address space portion) may be 1 GB although more generally, any suitable unit of storage may be used. Thus, based on the foregoing, an embodiment may determine the various slice sizes based on the average number of IOPS/GB for a particular logical address space portion. More generally, the average number of IOPS/GB represents the average I/O workload density per GB of storage as may be used in an embodiment in accordance with techniques herein as used in following examples.

In one embodiment, processing may initially begin with a starting large slice size, such as 8 GB, used for all slices. Periodically, processing as described in following paragraphs may be performed to determine whether to adjust the size of any existing slice where such size adjustment may be to either further partition a single slice into multiple smaller slices, or whether to merge two or more adjacent slices (e.g., having logical address spaces which are adjacent or contiguous with one another). The foregoing and other processing are described in more detail below.

Figure 4:
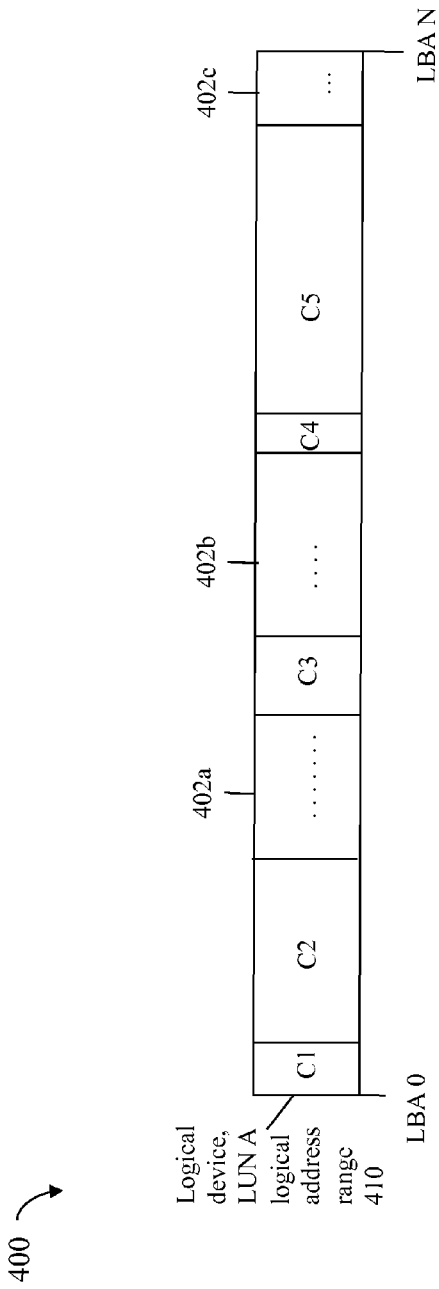
FIGS. 4 and 6 are examples illustrating partitioning of a logical address space into slices of various sizes in an embodiment in accordance with techniques herein.

Referring to FIG. 4, shown is an example illustrating different slice sizes that may be associated with a logical address space of a LUN, such as a thin LUN, in an embodiment in accordance with techniques herein. The example 400 includes element 410 denoting the entire logical address space range (from LBA 0 though N) for thin LUN A. C1-C5 may denote slices of different sizes each mapping to a portion or subrange of the logical address space of thin LUN A. Additionally, in this example, elements 402a-c denote portions (e.g., one or more other slices) of LUN A's logical address space which are not mapped to any physical storage and thus have no associated I/O workload or activity. As described in more detail below, each slice has a relative size that varies with the current average I/O workload/GB wherein, in one embodiment, the I/O workload or I/O activity may be expressed as IOPS. The example 400 is a snapshot representing the current values for the adjustable slice sizes used with LUN A at a first point in time. For example, the 5 slices C1-C5, may be ranked, from highest to lowest in terms of average IOPS/GB, as follows: C4, C1, C3, C2, C5. The example 400 may represent the slice sizes at the first point in time for thin LUN A after performing processing for several elapsed time periods during which I/O workload information was observed for LUN A and then used to determine whether to adjust slice sizes.

Based on the current values of average IOPS/GB for the slices C1-C5, current slice sizes for C1-C5 may be further dynamically adjusted, if needed. Slice size may be dynamically adjusted either by splitting the singe slice into multiple slices each of a smaller size to further identify one or more "hot spots" (areas of high I/O workload or activity), or by merging together adjacent relatively cold slices to get a bigger slice size. Such merging may merge together two or more existing slices which have contiguous LBA ranges (e.g., collectively form a single contiguous logical address portion of the LUN's address space). To further illustrate, the size of a slice, such as C3, may be dynamically adjusted by further partitioning the slice C3 into multiple slices each of a smaller size if the current observed average IOPS/GB for the slice C3 has a particularly high average IOPS/GB. Whether the current observed average IOPS/GB is sufficiently high enough (e.g., sufficiently hot or active enough) to warrant further partitioning into multiple slices may be made by qualifying or validating slice C3 for partitioning or splitting into multiple slices. Such qualifying may utilize the observed average IOPS/GB for C3. For example, whether the current observed average IOPS/GB for C3 is sufficiently high enough (e.g., sufficiently hot or active enough) to warrant further partitioning into multiple slices may be made by comparing the current slice size of C3 to a predetermined slice size based on the observed average IOPS/GB for C3. If the predetermined slice size is smaller than the current slice size, processing may be performed to partition C3 into multiple smaller size slices.

Two or more slices having adjacent or contiguous logical address portions for LUN A, such as C4 and C5, may be merged or combined into a single larger slice if both slices C4 and C5 each have a current observed average IOPS/GB that is sufficiently low enough (e.g., sufficiently cold or inactive) to warrant merging. Whether the current observed average IOPS/GB for each of two or more slices is sufficiently low enough to warrant merging into a single slice may be made by qualifying or validating for merging each of C4 and C5, and also validating or qualifying for merging the combined slice that would result from merging C4 and C5. Such qualifying or validating may use the observed average IOPS/GB for each existing slice C4 and C5 and the average IOPS/GB for the combined slice. For example, whether the current observed average IOPS/GB for each of C4 and C5 is sufficiently low enough (e.g., sufficiently cold or inactive enough) to warrant merging into a single slice may be made by comparing the current slice size of C4 to a predetermined slice size based on the observed average IOPS/GB for C4. A similar determination may be made for C5. For both of C4 and C5, if the predetermined slice size is larger than the current slice size, processing may be performed to merge C4 and C5.

The observed average IOPS/GB statistic may be calculated for each slice C1-C5 based on the logical address space portion associated with each slice. For example, assume C1 represents an 8 GB portion of LUN A's logical address space. For a time period during which I/O workload data is collected, the total number of I/Os directed to the 8B logical address space portion of LUN A are determined and an I/O rate (e.g., the total number of I/Os per second=IOPS) is determined. For example, assume C1 has an observed I/O rate or IOPS of 200 I/Os per second (200 IOPS). The foregoing I/O rate of 200 IOPS is then further divided by 8 GB where an observed average of 25 IOPS/GB is determined. In a similar manner, average IOPS/GB may be calculated for any combined slice resulting from merging two or more slices into the combined slice.

In an embodiment in accordance with techniques herein, I/O workload information may be collected as just described at each occurrence of a fixed time period. At the end of the time period that has elapsed, processing may be performed to evaluate slices and determine whether to merge or further partition existing slices. For a first time period, a first set of slices are analyzed to determine whether to further partition or merge any slices of the first set thereby resulting in a second set of slices for which I/O workload information is collected in the next second period. At the end of the second period, the second set of slices are analyzed in manner to determine whether to further partition or merge any slices of the second set thereby resulting in a third set of slices for which I/O workload information is collected in the next third period. The foregoing may be similarly repeated each time period.

In one embodiment, a table of predefined or established temperature-slice size relationships may be used in processing described in following paragraphs to determine a particular slice size for an observed temperature associated with a slice. In this example, the temperature may be the average I/O workload/GB expressed as IOPS/GB as observed for a slice based on collected I/O workload or activity information for a time period.

Referring to FIG. 5, shown is an example of a table of temperature-slice size relationships that may be used in an embodiment in accordance with techniques herein. The table 500 includes a column 510 of temperature ranges and column 520 includes predetermined or specified slice sizes. Each row of the table denotes a predetermined or specified slice size applicable when the observed temperature T, which is the observed average IOPS/GB in this example, falls with the particular predetermined temperature range in column 510 of the row. It should be noted that the table 500 includes a particular set of slice sizes in column 520 ranging from a maximum slice size of 16 GB to a smallest or minimum slice size of 8 MB. Generally, an embodiment may selected and suitable number of slice sizes spanning an suitable slice size range. Additionally, the mapping of a particular temperature range in 510 to a particular slice size in 520 may vary with embodiment and is not limited to that as illustrating in FIG. 5 for purposes of illustration.

To further illustrate, row 502a indicates that a first slice should have a slice size of 256 MB if the first slice has an observed average I/O workload/GB, denoted as T, where 32 IOPS/GB≤T<64 IOPS/GB for the time period for the first slice. Consider further an example where the first slice has an observed average I/O workload/GB of 62 IOPS/GB, then row 502a indicates the first slice should have a slice size of 256 MB. If the first slice currently has a slice size that is larger than the predetermined slice size 256 MB (as denoted by row 502a), processing may be performed to further partition the first slice into multiple smaller slices. For example, if the first slice currently has a slice size of 1024 MB=1 GB (which is larger than the specified slice size of 256 MB in the table entry 502a based on I/O workload or activity of 62 IOPS/GB for the current time period), the first slice of 1024 MB=1 GB may be partitioned into 4 smaller slices each of 256 MB based on the specified or predetermined slice size indicated in the applicable table entry. It should be noted that generally, the existing single slice may be partitioned into multiple slices each having a size that is less than current size of the single existing slice. In one embodiment, the smaller slices resulting from the partitioning may have sizes selected from a set of predetermined sizes, such as based on predetermined slice sizes in column 520 of FIG. 5 (e.g., sizes may be equal to one of the predetermined slice sizes in column 520).

Thus, generally, a determination may be made as to whether any adjustment is needed to a slice of a current slice size by determining whether the current slice size and current IOPS/GB maps to an entry in the table where the entry includes a predetermined slice size matching the current size and also where the current IOPS/GB falls within the entry's predetermined temperature range. If so, then no adjustment to the slice size is needed (e.g. neither splitting nor merging processing is performed). For example, a current slice having a slice size of 1 GB with an observed average I/O workload/GB=9 IOPS/GB maps properly to a matching entry 502d whereby the current 9 IOPS/GB matches or falls within the predetermined temperature range in column 510 for entry 502d and whereby the current slice size of 1 GB matches the predetermined slice size in column 520 for entry 502d.

However, consider the case where there is no such matching entry in the table 500 matching both the current slice size and current IOPS/GB of the slice. Consider first determining whether to split or partition the slice into multiple smaller slices with the example above for the slice having a current size of 1 GB and current I/O workload of 62 IOPS/GB. Such determination may be made in accordance with one or more partitioning criteria. Such criteria may include performing processing to validate or qualify the slice as a slice for which slice splitting or partitioning should be performed. This is described below in more detail in connection with an example. An entry or row in the table 500 may be located where the current 62 IOPS/GB falls within the predetermined temperature range in column 510. In this case, the row 502a is matched. For the current I/O workload of 62 IOPS/GB, entry 502a indicates the predetermined slice size should be 256 MB. The current slice size of 1 GB is larger than the predetermined slice size of 256 MB, so processing may be performed to split the slice into one or more smaller slices each having an associated I/O workload in IOPS/GB and associated slice size matching an entry in the table. Thus, the slice may be partitioned into 4 slice of 256 MB each.

As an alternative to, or in addition to the foregoing, in connection with determining whether to split a slice, an entry in the table may be located where the current slice size matches a predetermined slice size in column 520. Consider the example above for the slice having a current size of 1 GB and current I/O workload of 62 IOPS/GB. A row in table 500 may be located where the current slice size of 1 GB matches a predetermined slice size in column 520. In this case, row 502d is matched. For the current slice size of 1 GB, entry 502d indicates in column 510 that the predetermined I/O workload T should meet the following: 8 IOPS/GB≤T<16 IOPS/GB. The current I/O workload of 62 IOPS/GB is higher than the specified temperature range and therefore the slice should be split. As described above, processing may be performed to split the slice into one or more smaller slices each having an associated I/O workload in IOPS/GB and slice size matching an entry in the table. Thus, the slice may be partitioned into 4 slice of 256 MB each.

The foregoing illustrates an example of partitioning criteria that includes qualifying or validating the slice for partitioning, where qualifying or validating the slice for partitioning may include determining that the 62 IOPS/GB observed for the slice maps to a first predetermined slice size (256 MB) that is smaller than the current slice size of 1 GB. Furthermore, qualifying or validating the slice for partitioning may include determining that the current slice size of 1 GB maps to a first predetermined workload range (as in column 510 of entry 502d) and the 62 IOPS/GB observed for the slice exceeds the first predetermined workload range.

Figure 6:
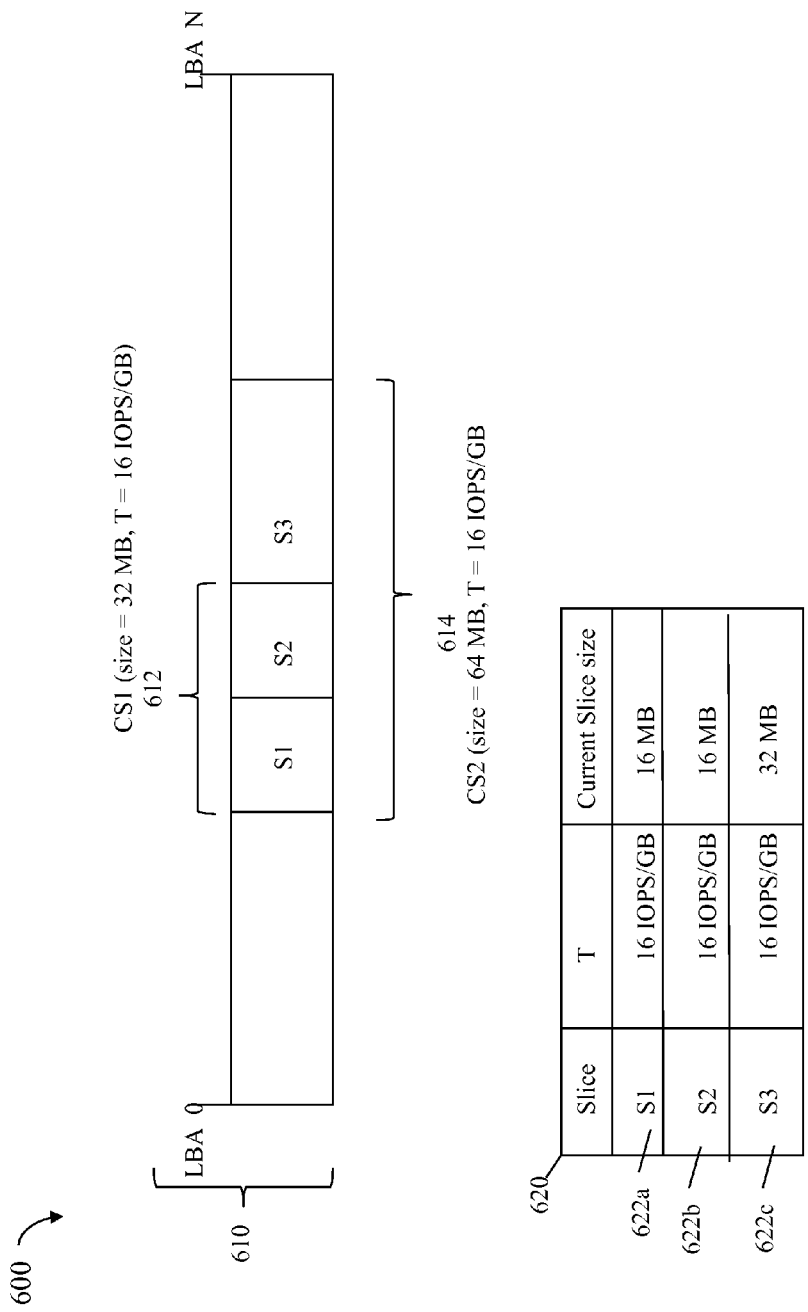

In a similar manner, the table of FIG. 5 may be used to determine whether to merge two slices which are logically adjacent having adjacent logical address space portions for the LUN. For example, reference is made to the example 600 of FIG. 6. In FIG. 6, element 610 may represent the logical address range of a thin LUN and S1, S2 and S3 may denote 3 adjacent slices which collectively have a combined logical address space that is contiguous.

Element 620 may represent a table of T values denoting observed average I/O workload (IOPS)/GB values for a time period. As indicated by row 622a, the first slice S1 may have a current slice size of 16 MB and an observed average I/O workload/GB=16 IOPS/GB. As indicated by row 622b, the second slice S2 adjacent to the first slice S1 may also have a current slice size of 16 MB and an observed average I/O workload/GB=16 IOPS/GB. Slices S1 and S2 are adjacent and each has a logical address space portion that, when combined, form a single contiguous logical address space portion for the LUN.

Processing may be performed to determine whether to merge or combine S1 and S2 into a single slice in accordance with one or more merge criteria that includes qualifying or validating both S1 and S2 individually and then also qualifying or validating the combined slice of S1 and S2 as would result if the proposed slice candidates S1 and S2 are combined. For each of the slices S1 and S2 having current T values as denoted in rows 622a-b of 620, entry 502b of table 500 of FIG. 5 may be identified where the entry identifies a range in column 510 which includes each slice's T value of 16 IOPS/GB. Based on entry 502b of the table 500 from FIG. 5, for the particular values of T (current observed average I/O workload of 16 IOPS/GB) for each of the foregoing slices S1 and S2, each such slice should have a much larger slice size of 512 MB rather than the current slice size of 16 MB. Thus, processing in an embodiment in accordance with techniques herein may determine that the foregoing slices S1 and S2 should be merged or combined since both slices have a current slice size that is less than the specified or predetermined slice size as indicated in the table 500. Furthermore, combining the first and second slices results in a single combined slice having a combined value of T=16 IOPS/GB (denoting the combined slice's average IOPS/GB based on the two T values 16 IOPS/GB for S1 and S2 in 622a and 622b) and a combined slice size of 32 MB. For the combined slice's value of T=16 IOPS/GB, the combined slice size of 32 MB also does not exceed the specified slice size of 512 MB of the table entry 502b. Put another way, the combined slice has a size of 32 MB which, based on entry 502c of the table, should have a corresponding current value of T, where 256 IOPS/GB≤T<512 IOPS/GB. However, the current value of T for the combined slice is only 16 IOPS/GB (e.g., does not exceed the foregoing temperature range<512 IOPS/GB).

Thus, two slices may be merged based on merge criteria that includes determining that each of the two slices has a current T (denoting the slice's observed average IOPS/GB) and a current slice size where the current slice size is less than a predetermined or specified slice size of the table row 502b for the current T. Put another way, each of the two slices S1 and S2 has a slice size of 16 MB matching a predetermined slice size in column 520 of entry 502e of table 500. Entry 502e includes an associated predetermined temperature range in column 510: 512 IOPS/GB≤T<1024 IOPS/GB, and the current T=16 IOPS/GB for each slice is less than this range and may therefore be merged. Thus, the merge criteria includes qualifying or validating the slice for merging, and wherein qualifying/validating the slice S1 for merging includes determining that the S1's current T=16 IOPS/GB maps to a first predetermined slice size of 512 MB in column 520 of entry 502b that is larger than the S1's current slice size=16 MB. Qualifying or validating the slice S1 for merging may include determining that S1's current slice size of 16 MB maps to a first predetermined workload range in column 510 of entry 502*e* and S1's current T=16 IOPS/G does not exceed the first predetermined workload range. In a similar manner, the merge criteria includes similarly qualifying or validating the second slice S2, the proposed candidate slice to be merged with S1.

Additionally, the merge criteria may also include qualifying or validating the resulting combined slice (resulting from combining S1 and S2). Qualifying or validating the resulting combined slice may include determining that the resulting size of the combined two slices does not exceed the specified slice size of row 502*b* based on a combined value of T determined for the combined slice. For example, the combined slice has a T value=16 IOPS/GB and a slice size of 32 MB. Merge criteria may include ensuring that, given the current T for the combined slice, the combined slice's size (e.g., 32 MB) does not exceed a predetermined size (e.g., 512 MB) specified for the current T (e.g., 16 IOPS/GB) of the combined slice. Put another way, entry 502*c* in table 500 may be selected which has a predetermined slice size 32 MB in column 520 that matches the slice size 32 MB of the combined slice. Merge criteria may include ensuring that the resulting combined slice's T of 16 IOPS/GB does not exceed the predetermined range in column 510 of entry 502*e* (e.g., 16 IOPS/GB is less than 1024 IOPS/GB).

Thus, the merge criteria includes qualifying or validating the combined slice of S1 and S2 where qualifying or validating the combined slice includes determining that the resulting combined slice's T=16 IOPS/GB is included in the predetermined temperature range of column 510 of entry 502*b* which maps to a predetermined slice size of 512 MB in column 520 of entry 502*b* where the combined slice's size of 32 MB does not exceed the predetermined size of 512 MB. Qualifying or validating the combined slice may include determining that the combined slice's size of 32 MB size maps to a predetermined workload range in column 510 of entry 502*c* and the combined slice T=16 IOPS/MB does not exceed the predetermined workload range (e.g., 256 IOPS/GB≤T<512 IOPS/GB).

Thus, at this point S1 and S2 may be merged into a first combined slice CS1 as denoted by 612 having a combined slice size of 32 MB and a T value=16 IOPS/GB for CS1. Processing may further continue to determine whether there is any other adjacent slice is a candidate that may possibly be merged with CS1. In this case, slice S3 is another slice and processing similar to that as just described above with respect to S1 and S2 may now be performed with respect to CS1 and S3 to determine whether to merge CS1 and S3. In this example, processing in accordance with the merge criteria may determine that S3 is adjacent to CS1, CS1 has a current slice size of 32 MB that is less than a predetermined slice size of 512 MB (denoted by table entry 502*b* selected for the current T=16 IOPS for CS1), and S3 has a current slice size of 32 MB that is less than a predetermined slice size of 512 MB (denoted by table entry 502*b* selected for the current T=16 IOPS for S3). Additionally, the second combined sliced CS2 614 (denoting the result of combining CS1 and S3) has a slice size of 64 MB which does not exceed the predetermined size of 512 MB denoted by table entry 502*b* selected for the current T of CS2=16 IOPS. Put another way, entry 502*f* of table 500 may be determined having a predetermined slice size in column 520 matching the slice size of 64 MB for the combined slice CS2. The current T for CS2=16 IOPS does not exceed the associated predetermined temperature range in column 510 of entry 502*f* and thus slice S3 may be further combined with CS2.

In this example, there are no further slices adjacent to combine with slice CS2 614 so merge processing in connection with CS2 may stop. However, if there were one or more other slices further adjacent to S1 or S3, merge processing may be performed in a similar manner as described above to determine, based on the merge criteria, whether to merge any other adjacent slice. Generally, such merge processing may continue until any one of the specified merge criteria is no longer met. For example, merge processing may stop with respect to a current slice if there are no further adjacent slices to consider for merging/combing. Merge processing may not validate an adjacent slice for merging with a slice if an adjacent slice has a current IOPS/GB and current slice size where both the current IOPS/GB and current slice size match an entry in the table 500. Merge processing may stop with respect to a current slice based on a resulting combined slice (that would be formed as a result of combining the current slice with another adjacent slice). For example, assume the resulting combined slice has an associated slice size that does not need further adjustment (e.g., if the current slice size and current IOPS/GB of the combined slice maps to an entry in the table 500 where the entry includes a predetermined slice size matching the current slice size and also where the current IOPS/GB of the combined slice falls within the entry's predetermined temperature range). If so, then no further adjustment to the combined slice size is needed (e.g. neither splitting nor merging processing is performed). In such a case, the merge proposed by the resulting combined slice may be performed and not further combined with any other adjacent slices.

As another example, merge processing may determine not to perform a proposed merge to generate a resulting combined slice based on the resulting combined slice. For example, assume a resulting combined slice has a slice size X and a resulting T value (e.g. denoting resulting IOPS/GB for the combined slice). An entry in the table may be located where the entry's predetermined slice size in column 520 matches X. The proposed merge may not be performed if the resulting T value for the combined slice is higher than the entry's predetermined temperature range in column 510. Put another way, an entry in the table may be located where the entry's predetermined temperature range in column 510 includes the resulting T value for the combined slice. The proposed merge may not be performed if the combined slice's size X exceeds the predetermined slice size in column 520. Thus, generally, merging may continue to generate a larger combined slice having a resulting size until the associated IOPS/GB of the combined slice exceeds the predetermined temperature range in the table 500 specified for the resulting size.

It should be noted that embodiment may use any other suitable criteria. For example, an embodiment may limit the number of slices that can merged. For example, an embodiment may specify a maximum number of slices that can be merged into a single slice at a point in time (for single collection or time period).

Thus, an embodiment in accordance with techniques herein may have slices with various slice sizes. By combining slices into a larger combined slice, the total number of slices may be reduced. A slice may be split into smaller size slices so that a "hot" data portion may be identified and relocated accordingly. For example, processing may be performed to only move the hot data portion to higher/highest storage tier. An embodiment in accordance with techniques herein may also perform processing to exclude particular slices from analysis. For example, idle slices or slices having an associated I/O workload/GB less than a specified threshold may be excluded from analysis and processing by considering such slices as properly located. Excluding such slices allows just a subset of data to be considered in processing described herein.

What will now be described in connection with FIGS. 7-10 are flowcharts of processing steps that may be performed in an embodiment in accordance with techniques herein which summarize processing described above.

Figure 7:
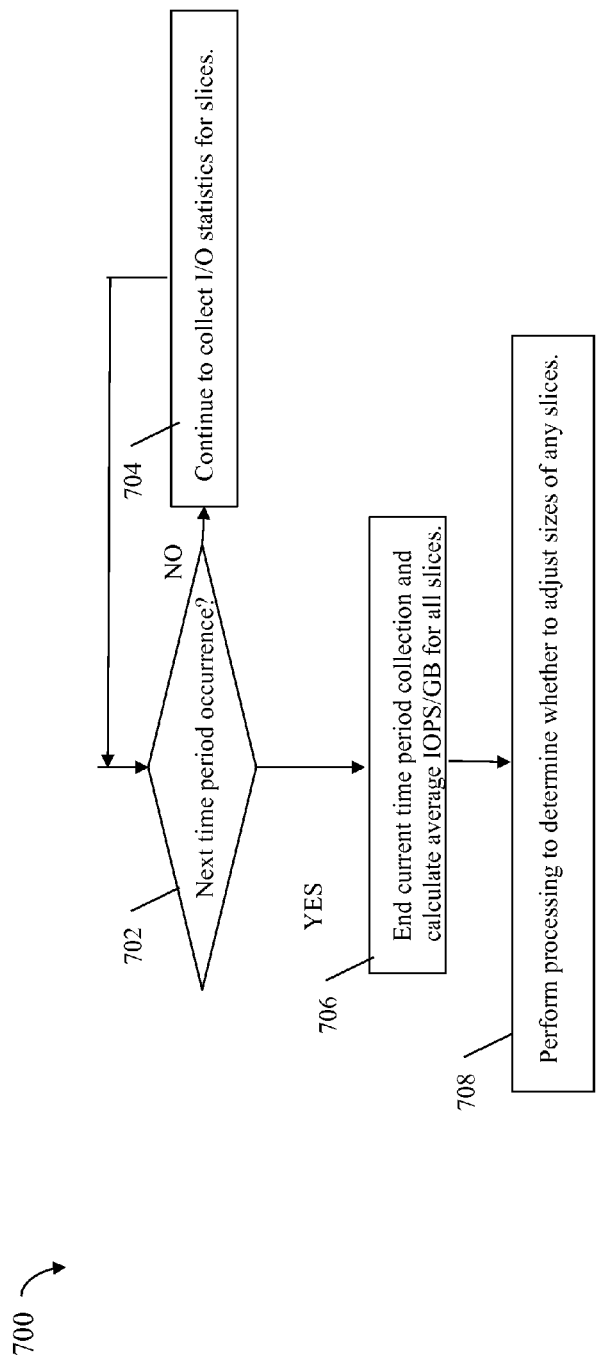

Referring to FIG. 7, shown is a first flowchart of processing steps that may be performed in an embodiment in accordance with techniques herein. The flowchart 700 processing may be performed to periodically collect I/O statistics regarding the I/O workload of the various slices and then further analyze the collected data to determine whether to adjust any slice sizes. At step 702, a determination is made as to whether the next time period has occurred whereby a fixed amount of time has elapsed since the previous time period. If step 702 evaluates to no, control proceeds to step 704 to continue to collect I/O statistics for the slices. If step 702 evaluates to yes, control proceeds to step 706 where the current time period collection is ended and the IOPS/GB, or more generally I/O workload density is calculated for the slices to be assessed in step 708. In step 708, processing is performed to determine whether to adjust sizes of any of the slices.

Figure 8:
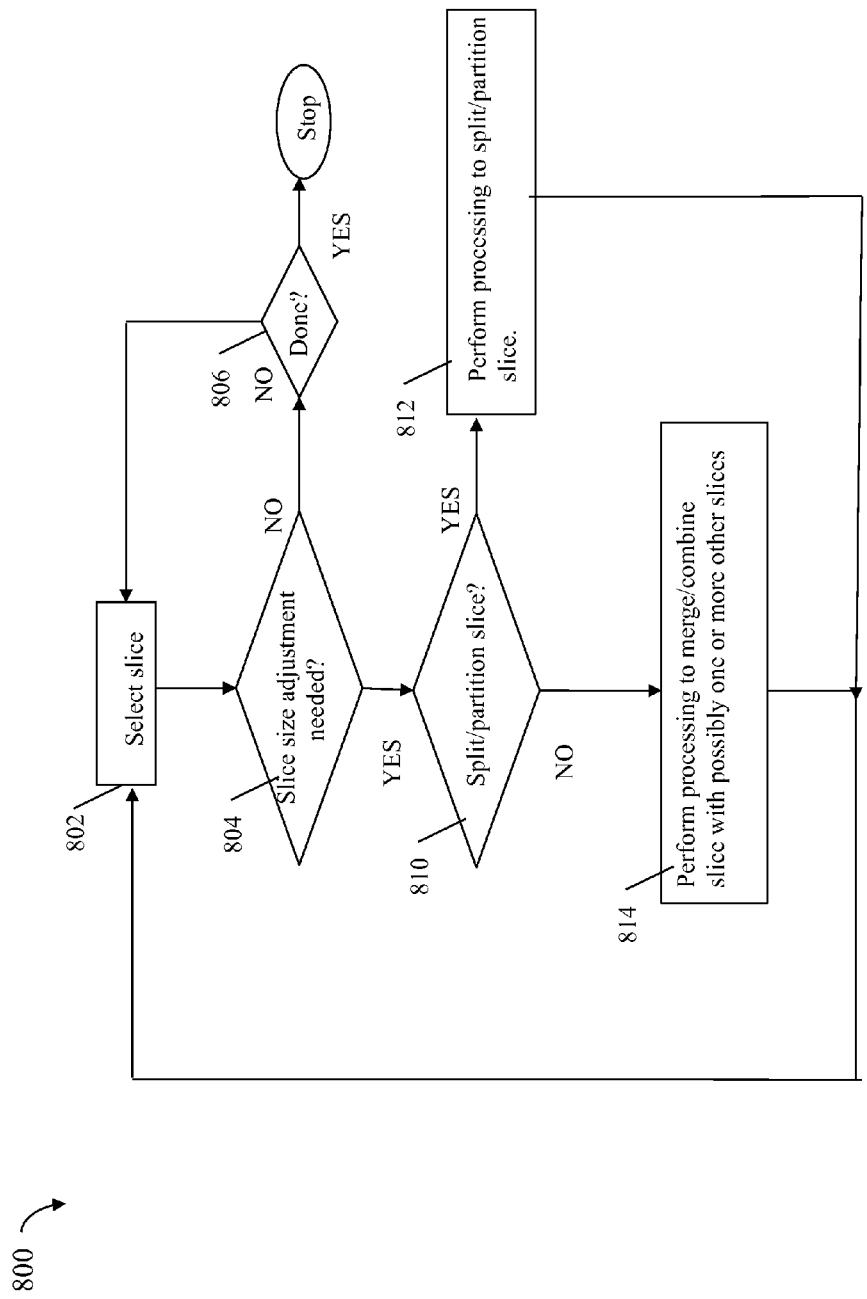

Referring to FIG. 8, shown is a second flowchart of processing steps that may be performed in an embodiment in accordance with techniques herein. The flowchart 800 processing provides more detail of step 708 that may be performed in one embodiment in accordance with techniques herein. At step 802, one of the slices is selected for processing. At step 804, a determination is made as to whether the current slice's size needs adjustment. If step 804 evaluates to no, control proceeds to step 806 where a determination is made as to whether all slices have been processed. If step 806 evaluates to yes, processing stops. If step 806 evaluates to no, control proceeds to step 802 to process the next slices.

If step 804 evaluates to yes, control proceeds to step 810 where a determination is made as to whether the to split or partition the current slice. If step 810 evaluates to yes, control proceeds to step 812 to perform processing to split/partition the current slice. From step 812, control proceeds to step 802. If step 810 evaluates to no, control proceeds to step 814 to perform processing to merge/combine the current slice with possibly one or more other slices. From step 810, control proceeds to step 802.

Figure 9:
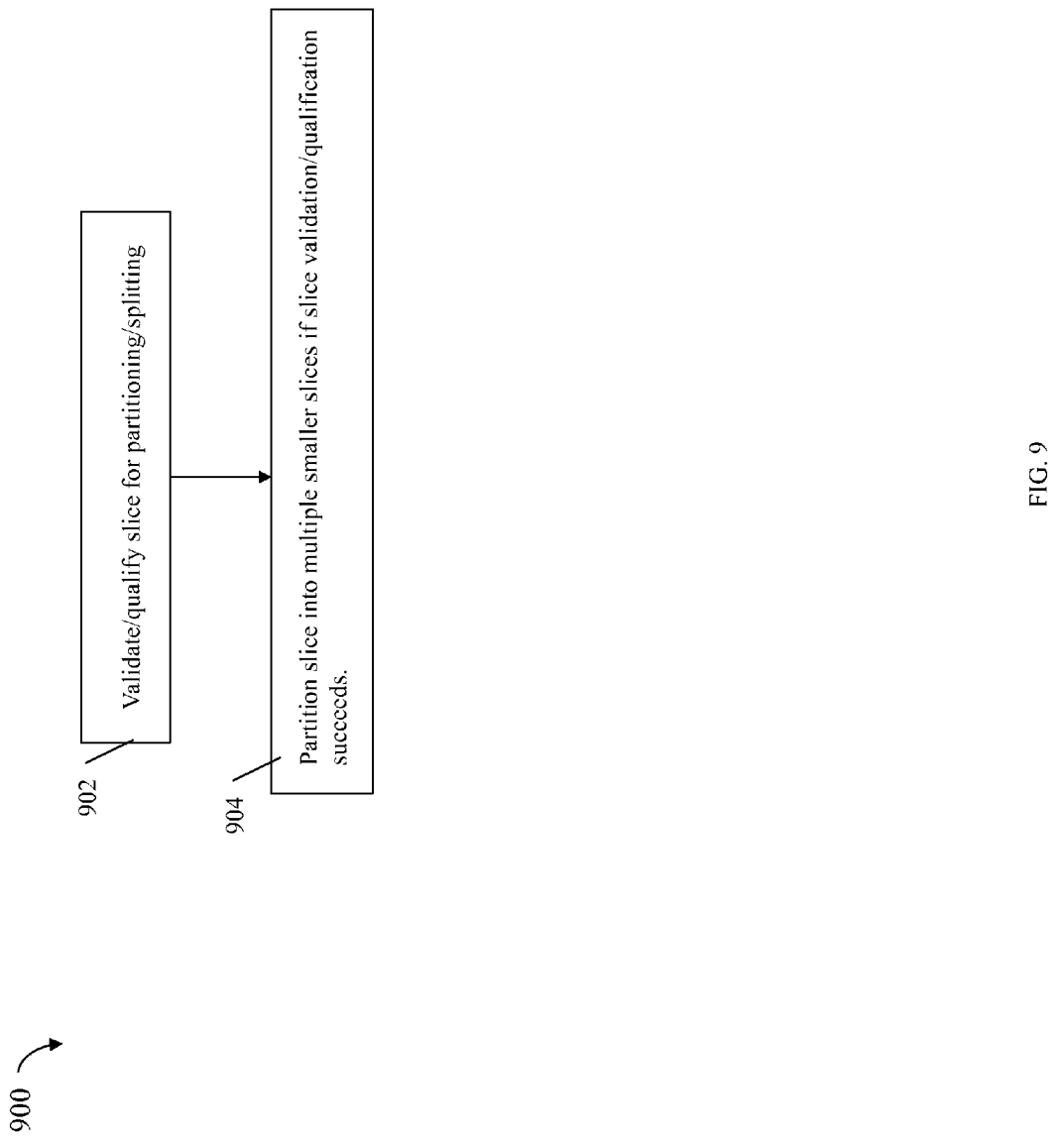

Referring to FIG. 9, shown is a third flowchart of processing steps that may be performed in an embodiment in accordance with techniques herein. The flowchart 900 processing is additional detail that may be performed in connection with steps 810 and 812 of FIG. 8 in an embodiment in accordance with techniques herein. At step 902, processing is performed to validate or qualify the current slice for partitioning. At step 904, the slice is partitioned into multiple smaller slices if the slice validation/qualification of step 902 succeeds.

Referring to FIG. 10, shown is a fourth flowchart of processing steps that may be performed in an embodiment in accordance with techniques herein. The flowchart 1000 illustrates in more detail processing may be performed in connection with step 814 of FIG. 8. At step 1002, processing may be performed to validate or qualify each of the current slice, a second slice to potentially be merged with the current slice, and the combined slice that would result from combining the current slice and the second slice. At step 1004, a determination is made as to whether the validations performed in step 1002 are all successful. If step 1004 evaluates to no, control proceeds to step 1010. If step 1004 evaluates to yes, control proceeds to step 1006 where the current slice and the second slice are combined. At step 1007, it is determined whether merging has been completed for the combined slice (e.g. whether the combined slice needs to be considered any further for possible merging with additional adjacent slices). As discussed above, step 1007 may evaluate to yes denoting that merging for the combined slice is complete/done, for example, if the combined slice has an associated IOPS/GB and slice size that matches a corresponding entry in the table 500 of FIG. 5 (e.g., IOPS/GB of the combined slice are within a predetermined range in column 510 of an entry and the slice size matches the predetermined slice size in column 520 of the same table entry). If step 1007 evaluates to yes, processing stops. If step 1007 evaluates to no, control proceeds to step 1008. At step 1008, the variable current slice is assigned the combined slice. At step 1010, a determination is made as to whether there are any more slice candidates that may be evaluated for possibly merging with the current slice. If step 1010 evaluates to no, merge processing for the current slice stops. If step 1010 evaluates to yes, control proceeds to step 1002 to further evaluate an additional slice (second slice) as a merge candidate.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of determining slice sizes comprising:
receiving first I/O workload information for a slice having a corresponding logical address subrange of a logical address range of a logical device, said corresponding logical address subrange having a first size denoting a size of the slice at a first point in time when the slice has a current I/O workload denoted by the first I/O workload information;
receiving second I/O workload information for a second slice having a second corresponding logical address subrange of the logical address range of the logical device, said second corresponding logical address subrange having a second size denoting a size of the second slice at the first point in time when the second slice has a current I/O workload denoted by the second I/O workload information, wherein said second size of the second slice is different than said first size of the slice, and wherein the first size of the slice and the second size of the second slice denote data movement size units used by data storage optimization processing;
performing the data storage optimization processing that includes determining whether to relocate the first slice of the first size from a first source tier to a first target tier, and whether to relocate the second slice of the second size from a second source tier to a second target tier;

determining, in accordance with the first I/O workload information, whether to adjust the size of the slice; and responsive to determining to adjust the size of the slice, performing first processing that adjusts the size of the slice from the first size to a revised first size.

2. The method of claim 1, wherein the first processing includes:

determining whether to partition the slice in accordance with one or more partitioning criteria; and responsive to determining to partition the slice in accordance with the one or more partitioning criteria, partitioning the slice into a plurality of slices each of a smaller size than the first size.

3. The method of claim 2, wherein the one or more partitioning criteria includes validating the slice for partitioning, and wherein said validating the slice for partitioning includes performing:

determining whether the first I/O workload information maps to a first predetermined slice size that is smaller than the first size;

determining whether the first size maps to a first predetermined workload range and whether the first I/O workload information exceeds the first predetermined workload range; and responsive to determining that the first I/O workload information maps to a first predetermined slice size that is smaller than the first size, or determining that the first size maps to a first predetermined workload range and the first I/O workload information exceeds the first predetermined workload range, determining the slice as valid for partitioning into multiple slices.

4. The method of claim 2, wherein at least one of the plurality of slices has a size equal to the first predetermined slice size.

5. The method of claim 1, wherein the first processing includes:

determining, in accordance with one or more merge criteria, whether to combine the slice with one or more other adjacent slices of the logical device into a single combined slice having a size larger than the first size; and responsive to determining that the slice is to be combined with the one or more adjacent slices, combining the slice with the one or more adjacent slices into the single combined slice, wherein the one or more adjacent slices include the second slice.

6. The method of claim 5, wherein the one or more merge criteria includes validating the slice for merging, and wherein said validating the slice for merging includes performing any of:

determining whether the first I/O workload information maps to a first predetermined slice size that is larger than the first size;

determining whether the first size maps to a first predetermined workload range and whether the first I/O workload information does not exceed the first predetermined workload range; and responsive to determining that the first I/O workload information maps to a first predetermined slice size that is larger than the first size, or determining that the first size maps to a first predetermined workload range and the first I/O workload does not exceed the first predetermined workload range, determining the slice as valid for merging with one or more other slices.

7. The method of claim 5, wherein the one or more merge criteria includes validating the second slice for merging, wherein said validating the second slice for merging includes determining that the second slice is adjacent to the slice in the logical address range of the logical device.

8. The method of claim 7, wherein said validating the second slice for merging includes performing:

determining whether the second I/O workload information for the second slice maps to a predetermined slice size that is larger than second size;

determining whether the second size maps to a second predetermined workload range and whether the second I/O workload information does not exceed the second predetermined workload range; and responsive to determining that the second I/O workload information maps to a predetermined slice size that is larger than the second size, or determining that the second size maps to a second predetermined workload range and the second I/O workload information does not exceed the second predetermined workload range, determining the second slice as valid for merging with one or more other slices.

9. The method of claim 8, wherein combining the slice and the second slice results in a first combined slice of a third size having a resulting third I/O workload information, and wherein the one or more merge criteria includes validating the first combined slice, wherein said validating the first combined slice includes performing:

determining whether the third I/O workload information maps to a predetermined slice size and the third size does not exceed the predetermined slice size determining whether the third size maps to a predetermined workload range and whether the third I/O workload information does not exceed the predetermined workload range;

responsive to determining that the third I/O workload information maps to a predetermined slice size and the third size does not exceed the predetermined slice size, or determining that the third size maps to a predetermined workload range and the third I/O workload information does not exceed the predetermined workload range, determining the first combined slice as a valid slice resulting from a proposed merge of the slice and the second slice; and responsive to the first slice being determined as valid for merging, the second slice being determined as valid for merging, and the first combined slice being determined as a valid slice resulting from a proposed merge of the slice and the second slice, combining the first slice and the second slice into the first combined slice.

10. The method of claim 7, wherein the second slice is determined as adjacent to the slice and said second corresponding logical address subrange and said corresponding logical address subrange form a contiguous logical address subrange included in the logical address range of the logical device.

11. The method of claim 1, wherein the logical device is a virtually provisioned logical device.

12. The method of claim 1, wherein the slice is one of a plurality of slices of the logical device, each of the plurality of slices being associated with a logical address subrange of the logical address range of the logical device.

13. The method of claim 12, further comprising:

performing processing to collect I/O workload information for each of the plurality of slices for a first time period, said first point in time denoting an end of the first time period.

14. The method of claim 13, wherein the I/O workload information for each of the plurality of slices includes an I/O workload density.

15. The method of claim 14, wherein the I/O workload density is represented as an average I/O workload per unit of storage.

16. The method of claim 15, wherein the average I/O workload is an average number of I/Os per unit of time per unit of storage.

17. The method of claim 1, wherein the first processing uses information including a table of predetermined slice sizes associated with corresponding predetermined I/O workload values, each of the predetermined slice sizes denoting a slice size used when current I/O workload for a single slice is included in a range of one or more predetermined I/O workload values associated with said each predetermined slice size.

18. A system comprising:
a processor; and a memory comprising code stored therein that, when executed, performs a method of determining slice sizes comprising:
receiving first I/O workload information for a slice having a corresponding logical address subrange of a logical address range of a logical device, said corresponding logical address subrange having a first size denoting a size of the slice at a first point in time when the slice has a current I/O workload denoted by the first I/O workload information;
receiving second I/O workload information for a second slice having a second corresponding logical address subrange of the logical address range of the logical device, said second corresponding logical address subrange having a second size denoting a size of the second slice at the first point in time when the second slice has a current I/O workload denoted by the second I/O workload information wherein said second size of the second slice is different than said first size of the slice, and wherein the first size of the slice and the second size of the second slice denote data movement size units used by data storage optimization processing;
performing the data storage optimization processing that includes determining whether to relocate the first slice of the first size from a first source tier to a first target tier, and whether to relocate the second slice of the second size from a second source tier to a second target tier;
determining, in accordance with the first I/O workload information, whether to adjust the size of the slice; and
responsive to determining to adjust the size of the slice, performing first processing that adjusts the size of the slice from the first size to a revised first size.

19. A non-transitory computer readable medium comprising code stored thereon that, when executed, performs a method of determining slice sizes comprising:
receiving first I/O workload information for a slice having a corresponding logical address subrange of a logical address range of a logical device, said corresponding logical address subrange having a first size denoting a size of the slice at a first point in time when the slice has a current I/O workload denoted by the first I/O workload information;
receiving second I/O workload information for a second slice having a second corresponding logical address subrange of the logical address range of the logical device, said second corresponding logical address subrange having a second size denoting a size of the second slice at the first point in time when the second slice has a current I/O workload denoted by the second I/O workload information, wherein said second size of the second slice is different than said first size of the slice, and wherein the first size of the slice and the second size of the second slice denote data movement size units used by data storage optimization processing;
performing the data storage optimization processing that includes determining whether to relocate the first slice of the first size from a first source tier to a first target tier, and whether to relocate the second slice of the second size from a second source tier to a second target tier;
determining, in accordance with the first I/O workload information, whether to adjust the size of the slice; and
responsive to determining to adjust the size of the slice, performing first processing that adjusts the size of the slice from the first size to a revised first size.

20. The non-transitory computer readable medium of claim 19, wherein the first processing includes performing any of determining, in accordance with partitioning criteria, whether to partition the slice; and determining, in accordance with merge criteria, whether to merge the slice with one or more other slices.

* * * * *

UNITED STATES PATENT AND TRADEMARK OFFICE
CERTIFICATE OF CORRECTION

PATENT NO. : 9,916,090 B1  
APPLICATION NO. : 14/861488  
DATED : March 13, 2018  
INVENTOR(S) : Khang Can and Qin Tao Page 1 of 1

It is certified that error appears in the above-identified patent and that said Letters Patent is hereby corrected as shown below:

On the Title Page

Item (72), should read:
(72) Inventors: Khang Can, Framingham, MA (US); Qin Tao, Hopkinton, MA (US)

Signed and Sealed this  
First Day of May, 2018

Andrei Iancu  
*Director of the United States Patent and Trademark Office*